US011955104B2

(12) United States Patent
Watanabe

(10) Patent No.: US 11,955,104 B2
(45) Date of Patent: Apr. 9, 2024

(54) ACCOMPANIMENT SOUND GENERATING DEVICE, ELECTRONIC MUSICAL INSTRUMENT, ACCOMPANIMENT SOUND GENERATING METHOD AND NON-TRANSITORY COMPUTER READABLE MEDIUM STORING ACCOMPANIMENT SOUND GENERATING PROGRAM

(71) Applicant: Yamaha Corporation, Hamamatsu (JP)

(72) Inventor: Daichi Watanabe, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 547 days.

(21) Appl. No.: 17/149,385

(22) Filed: Jan. 14, 2021

(65) Prior Publication Data

US 2021/0225345 A1 Jul. 22, 2021

(30) Foreign Application Priority Data

Jan. 17, 2020 (JP) ................................ 2020-006370

(51) Int. Cl.
*G10H 1/38* (2006.01)

(52) U.S. Cl.
CPC .................................. *G10H 1/383* (2013.01)

(58) Field of Classification Search
CPC ..................................................... G10H 1/383
USPC ........................................................... 84/637
See application file for complete search history.

(56) References Cited

U.S. PATENT DOCUMENTS

| | | | | |
|---|---|---|---|---|
| 5,164,531 A | | 11/1992 | Imaizumi et al. | |
| 5,270,479 A | * | 12/1993 | Kondo ..................... | G10H 1/40 84/DIG. 12 |
| 5,756,917 A | * | 5/1998 | Watanabe ................ | G10H 1/36 84/634 |
| 5,900,566 A | * | 5/1999 | Mino ................... | H04N 21/431 84/610 |

(Continued)

FOREIGN PATENT DOCUMENTS

| | | | | |
|---|---|---|---|---|
| CN | 104882136 A | * | 9/2015 | ............... G10H 1/00 |
| CN | 105637579 A | * | 6/2016 | ............... G10H 1/40 |

(Continued)

OTHER PUBLICATIONS

Japanese-language office action issued in Japanese Application No. 2020-006370 dated Aug. 29, 2023 with English translation (6 pages).

(Continued)

*Primary Examiner* — Christina M Schreiber
(74) *Attorney, Agent, or Firm* — Crowell & Moring LLP

(57) ABSTRACT

An accompaniment sound generating device includes a specifier, an accompaniment sound generator, and an accompaniment sound outputter. The specifier specifies a plurality of musical performance parts for which accompaniment sounds are generated based on an input musical performance sound. The accompaniment sound generator generates the accompaniment sounds that belong to the plurality of specified musical performance parts for each musical performance sound. The accompaniment sound outputter outputs the accompaniment sounds generated for the plurality of musical performance parts with timing for generating the accompaniment sounds aligned with timing for generating musical performance sounds.

8 Claims, 9 Drawing Sheets

(56) References Cited

U.S. PATENT DOCUMENTS

| | | | | |
|---|---|---|---|---|
| 7,200,813 | B2 * | 4/2007 | Funaki | G10H 1/0008 84/645 |
| 2003/0014262 | A1 * | 1/2003 | Kim | A63F 13/215 704/278 |
| 2003/0110927 | A1 * | 6/2003 | Kira | G10H 1/36 84/613 |
| 2012/0011988 | A1 * | 1/2012 | Hara | G10H 1/40 84/613 |
| 2013/0151556 | A1 * | 6/2013 | Watanabe | G06F 16/632 707/769 |
| 2016/0063975 | A1 * | 3/2016 | Chu | G10H 1/0033 84/645 |
| 2017/0084261 | A1 * | 3/2017 | Watanabe | G10H 1/0025 |
| 2018/0277075 | A1 * | 9/2018 | Nakamura | G10H 1/344 |
| 2020/0312289 | A1 * | 10/2020 | Yoshino | G10H 1/12 |
| 2021/0225345 | A1 * | 7/2021 | Watanabe | G10H 1/383 |
| 2021/0295819 | A1 * | 9/2021 | Danjyo | G10L 13/0335 |

FOREIGN PATENT DOCUMENTS

| | | | | | |
|---|---|---|---|---|---|
| CN | 104575476 | B | * | 1/2019 | G10H 1/0025 |
| JP | H07219549 | A | * | 8/1995 | |
| JP | H11259073 | A | * | 9/1999 | |
| JP | 2000099050 | A | * | 4/2000 | |
| JP | 2005107031 | A | * | 4/2005 | |
| JP | 2006301019 | A | * | 11/2006 | |
| JP | 2008089849 | A | * | 4/2008 | |
| JP | 2014153647 | A | * | 8/2014 | |
| JP | 2016-161900 | A | | 9/2016 | |
| JP | 2016161900 | A | * | 9/2016 | |
| JP | 2016161901 | A | * | 9/2016 | |
| JP | 2017-58597 | A | | 3/2017 | |
| JP | 2017058594 | A | * | 3/2017 | G10H 1/40 |
| JP | 2019008336 | A | * | 1/2019 | |
| JP | 2019179277 | A | * | 10/2019 | G10H 1/0025 |
| JP | 2019200427 | A | * | 11/2019 | G10H 1/40 |

OTHER PUBLICATIONS

German-language Office Action issued in German Application No. 10 2021 200 208.0 dated Nov. 28, 2023 with English translation (10 pages).

Chinese-language Office Action issued in Chinese Application No. 202011577931.X dated Jan. 11, 2024, with partial English translation (8 pages).

* cited by examiner

F I G. 4

| MODE | MUSICAL PERFOFMANCE SOUND (INPUT SOUND) | STRENGTH CONDITION | CONVERSION DESTINATION | | MUTE SUBJECT | MUTE CANCELLATION TIME |
|---|---|---|---|---|---|---|
| | | | PART | PITCH (MUSICAL INSTRUMENT) | | |
| ACCENT | TOP NOTE | STRONG | MAIN DRUM | HIGH (CYMBAL) | ONE SOUND | AFTER PREDETERMINED TIME ELAPSES |
| | | EQUAL TO OR STRONGER THAN MEDIUM STRENGTH AND WEAKER THAN STRONG | MAIN DRUM | MEDIUM (SNARE) | ONE SOUND | AFTER PREDETERMINED TIME ELAPSES |
| | ALL NOTES | NONE | CHORD 1 | INPUT PITCH | CHORD 1 PART | DETECTION OF OFF OF INPUT SOUND |
| | | NONE | CHORD 2 | INPUT PITCH | CHORD 2 PART | DETECTION OF OFF OF INPUT SOUND |
| | | NONE | PAD | INPUT PITCH | PAD PART | DETECTION OF OFF OF INPUT SOUND |
| | | NONE | PHRASE 1 | INPUT PITCH | PHRASE 1 PART | DETECTION OF OFF OF INPUT SOUND |
| | CHORD | STRONG | MAIN DRUM | HIGH (CYMBAL) | ONE SOUND | AFTER PREDETERMINED TIME ELAPSES |
| | | EQUAL TO OR STRONGER THAN MEDIUM STRENGTH AND WEAKER THAN STRONG | MAIN DRUM | LOW (KICK) | ONE SOUND | AFTER PREDETERMINED TIME ELAPSES |
| | | EQUAL TO OR STRONGER THAN MEDIUM STRENGTH AND WEAKER THAN STRONG | BASE | CHORD ROOT | BASE PART | DETECTION OF OFF OF INPUT SOUND |
| | | EQUAL TO OR STRONGER THAN MEDIUM STRENGTH AND WEAKER THAN STRONG | PHRASE 2 | CHORD ROOT | PHRASE 2 PART | DETECTION OF OFF OF INPUT SOUND |
| | BOTTOM NOTE | EQUAL TO OR STRONGER THAN MEDIUM STRENGTH AND WEAKER THAN STRONG | MAIN DRUM | LOW (KICK) | ONE SOUND | AFTER PREDETERMINED TIME ELAPSES |
| | | EQUAL TO OR STRONGER THAN MEDIUM STRENGTH AND WEAKER THAN STRONG | BASE | BOTTOM NOTE | BASE PART | DETECTION OF OFF OF INPUT SOUND |
| | | EQUAL TO OR STRONGER THAN MEDIUM STRENGTH AND WEAKER THAN STRONG | PHRASE 2 | BOTTOM NOTE | PHRASE 2 PART | DETECTION OF OFF OF INPUT SOUND |

FIG. 5

| MODE | MUSICAL PERFOFMANCE SOUND (INPUT SOUND) | STRENGTH CONDITION | CONVERSION DESTINATION | | MUTE SUBJECT | MUTE CANCELLATION TIME |
|---|---|---|---|---|---|---|
| | | | PART | PITCH (MUSICAL INSTRUMENT) | | |
| UNISON | TOP NOTE | STRONG | MAIN DRUM | HIGH (CYMBAL) | ONE SOUND | AFTER PREDETERMINED TIME ELAPSES |
| | | STRONG | MAIN DRUM | MEDIUM (SNARE) | ONE SOUND | AFTER PREDETERMINED TIME ELAPSES |
| | | NONE | CHORD 1 | TOP NOTE | CHORD 1 PART | DETECTION OF OFF OF INPUT SOUND |
| | | EQUAL TO OR STRONGER THAN MEDIUM STRENGTH AND WEAKER THAN STRONG | PHRASE 1 | TOP NOTE | PHRASE 1 PART | DETECTION OF OFF OF INPUT SOUND |
| | ALL NOTES | NONE | CHORD 1 | INPUT PITCH | CHORD 1 PART | DETECTION OF OFF OF INPUT SOUND |
| | | NONE | CHORD 2 | INPUT PITCH | CHORD 2 PART | DETECTION OF OFF OF INPUT SOUND |
| | | NONE | PAD | INPUT PITCH | PAD PART | DETECTION OF OFF OF INPUT SOUND |
| | CHORD | STRONG | MAIN DRUM | HIGH (CYMBAL) | ONE SOUND | AFTER PREDETERMINED TIME ELAPSES |
| | | NONE | MAIN DRUM | MEDIUM (SNARE) | ONE SOUND | AFTER PREDETERMINED TIME ELAPSES |
| | | NONE | MAIN DRUM | LOW (KICK) | ONE SOUND | AFTER PREDETERMINED TIME ELAPSES |
| | | EQUAL TO OR STRONGER THAN MEDIUM STRENGTH AND WEAKER THAN STRONG | BASE | CHORD ROOT | BASE PART | DETECTION OF OFF OF INPUT SOUND |
| | | EQUAL TO OR STRONGER THAN MEDIUM STRENGTH AND WEAKER THAN STRONG | PHRASE 2 | CHORD ROOT | PHRASE 2 PART | DETECTION OF OFF OF INPUT SOUND |
| | BOTTOM NOTE | STRONG | MAIN DRUM | LOW (KICK) | ONE SOUND | AFTER PREDETERMINED TIME ELAPSES |
| | | NONE | BASE | BOTTOM NOTE | BASE PART | DETECTION OF OFF OF INPUT SOUND |
| | | NONE | PHRASE 2 | BOTTOM NOTE | PHRASE 2 PART | DETECTION OF OFF OF INPUT SOUND |

ACCOMPANIMENT SOUND GENERATING DEVICE, ELECTRONIC MUSICAL INSTRUMENT, ACCOMPANIMENT SOUND GENERATING METHOD AND NON-TRANSITORY COMPUTER READABLE MEDIUM STORING ACCOMPANIMENT SOUND GENERATING PROGRAM

BACKGROUND

Technical Field

The present disclosure relates to an accompaniment sound generating device, an accompaniment sound generating method, a non-transitory computer readable medium storing an accompaniment sound generating program and an electronic musical instrument including the accompaniment sound generating device.

Description of Related Art

Electronic musical instruments including a function that adds an automatic accompaniment sound to a musical performance sound input by a player based on prestored accompaniment pattern data have been known. There is an electronic keyboard musical instrument that includes an automatic accompaniment function, for example. When the player gives a musical performance by using a keyboard, the electronic keyboard musical instrument outputs an automatic accompaniment sound in accordance with a musical performance sound. An automatic accompaniment data generating device controls the rhythm of an automatic accompaniment sound to be in accordance with an accent position of a musical performance.

SUMMARY

The player plays an electronic musical instrument including an automatic accompaniment function, thereby being able to enjoy a musical performance sound accompanying an accompaniment sound while playing a melody, for example. Since the automatic accompaniment function generates an accompaniment sound repeatedly based on accompaniment pattern data, the accompaniment sound may be monotonous to the player. In order to provide further enjoyment of a musical performance to the player, it is expected that the automatic accompaniment function generates an accompaniment sound having variations.

An object of the present disclosure is to generate an automatic accompaniment sound having variations.

An accompaniment sound generating device according to one aspect of the present disclosure includes a specifier that specifies a plurality of musical performance parts for which accompaniment sounds are to be generated based on an input musical performance sound, an accompaniment sound generator that generates the accompaniment sounds that belong to the plurality of specified musical performance parts for each musical performance sound and an accompaniment sound outputter that outputs the accompaniment sounds generated for the plurality of musical performance parts with timing for generating the accompaniment sounds aligned with timing for generating musical performance sounds.

Other features, elements, characteristics, and advantages of the present disclosure will become more apparent from the following description of preferred embodiments of the present disclosure with reference to the attached drawings, in which:

BRIEF DESCRIPTION OF THE DRAWING

FIG. 4 is a diagram showing the setting information of an accent mode;

FIG. 5 is a diagram showing the setting information of an unison mode;

DETAILED DESCRIPTION

An accompaniment sound generating device, an electronic musical instrument, an accompaniment sound generating method and a non-transitory computer readable medium storing an accompaniment sound generating program according to embodiments of the present disclosure will be described below in detail with reference to the drawings.

(1) Configuration of Electronic Musical Instrument

Figure 1:
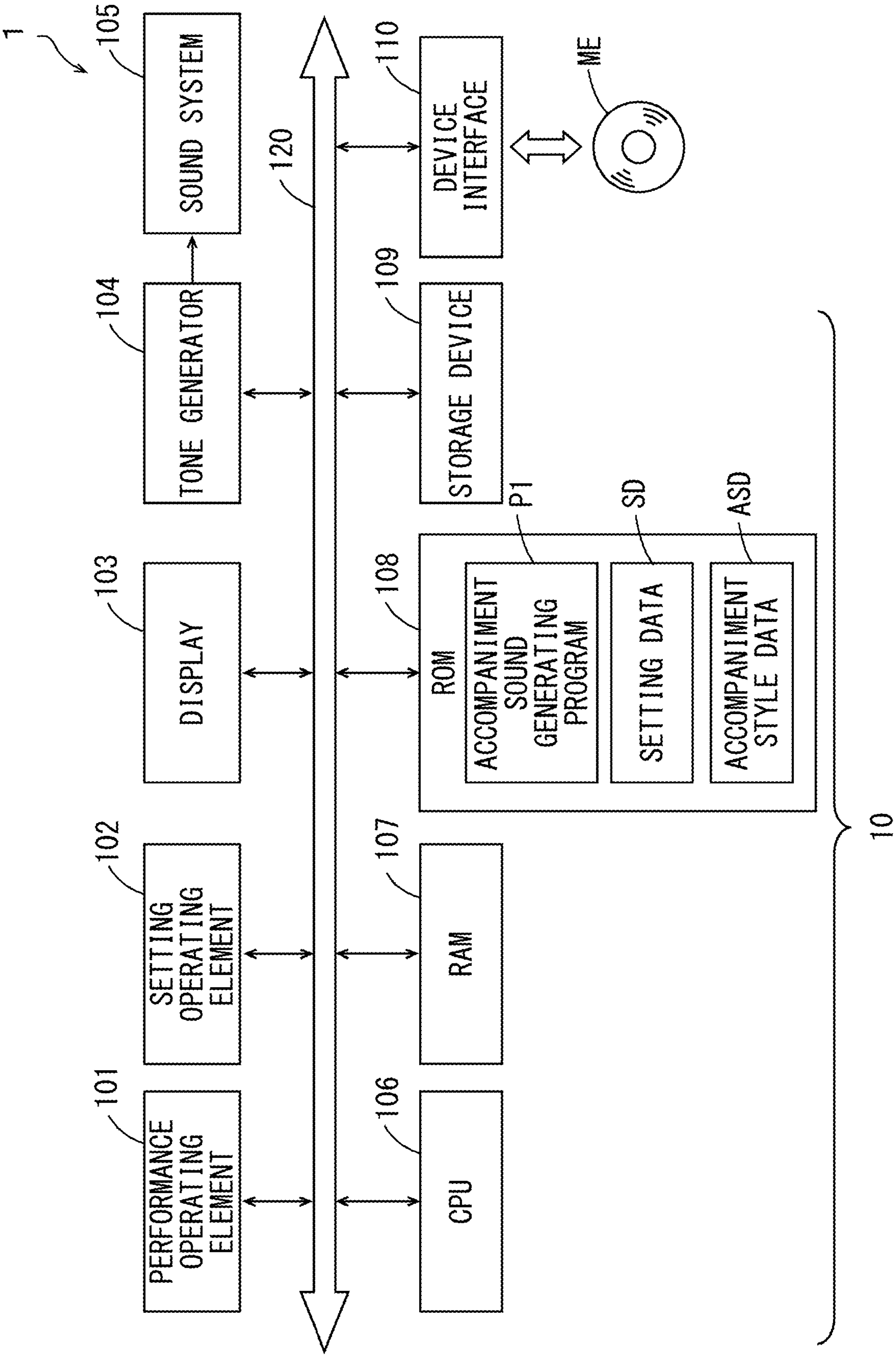
FIG. 1 is a block diagram showing the functions of an electronic musical instrument.

FIG. 1 is a block diagram showing the configuration of the electronic musical instrument 1 including the accompaniment sound generating device 10. A player can play a music piece by using the electronic musical instrument 1. Further, the electronic musical instrument 1 can add an automatic accompaniment sound to a musical performance sound input by the player by causing the accompaniment sound generating device 10 to operate.

The electronic musical instrument 1 includes a performance operating element 101, a setting operating element 102 and a display 103. The performance operating element 101 includes a pitch specifying operator such as a keyboard and is connected to a bus 120. The performance operating element 101 receives a musical performance operation performed by the player and outputs musical performance data representing a musical performance sound. The musical performance data is made of MIDI (Musical Instrument Digital Interface) data or audio data. The setting operating element 102 includes a switch that is operated in an on-off manner, a rotary encoder that is operated in a rotational manner, a linear encoder that is operated in a sliding manner, etc. and is connected to the bus 120. The setting operating element 102 is used for adjustment of the volume of a musical performance sound or an automatic accompaniment sound, on-off of a power supply and various settings. The display 103 includes a liquid crystal display, for example, and is connected to the bus 120. Various information related to a musical performance, settings, etc. is displayed on the display 103. At least part of the performance operating element 101, the setting operating element 102 and the display 103 may be constituted by a touch panel display.

The electronic musical instrument 1 further includes a CPU (Central Processing Unit) 106, a RAM (Random Access Memory) 107, a ROM (Read Only Memory) 108 and a storage device 109. The CPU 106, the RAM 107, the ROM 108 and the storage device 109 are connected to the bus 120. The CPU 106, the RAM 107, the ROM 108 and the storage device 109 constitute the accompaniment sound generating device 10.

The RAM 107 is made of a volatile memory, for example, which is used as a working area for execution of a program by the CPU 106 and temporarily stores various data. The ROM 108 is made of a non-volatile memory, for example, and stores a computer program such as an accompaniment sound generating program P1 and various data such as setting data SD and accompaniment style data set ASD. A flash memory such as EEPROM is used as the ROM 108. The CPU 106 executes the accompaniment sound generating program P1 stored in the ROM 108 while utilizing the RAM 107 as a working area, thereby executing an automatic accompaniment process, described below.

The storage device 109 includes a storage medium such as a hard disc, an optical disc, a magnetic disc or a memory card. The accompaniment sound generating program P1, the setting data SD or the accompaniment style data set ASD may be stored in the storage device 109.

The accompaniment sound generating program P1 in the present embodiment may be supplied in the form of being stored in a recording medium ME which is readable by a computer and installed in the ROM 108 or the storage device 109. The CPU 106 can access a storage medium ME through the device interface 110. In addition, in a case where the communication I/F included in the electronic musical instrument 1 is connected to a communication network, the accompaniment sound generating program P1 delivered from a server connected to the communication network may be installed in the ROM 108 or the storage device 109. Similarly, the setting data SD or the accompaniment style data set ASD may be acquired from a storage medium or may be acquired from a server connected to the communication network.

The electronic musical instrument 1 further includes a tone generator 104 and a sound system 105. The tone generator 104 is connected to the bus 120, and the sound system 105 is connected to the tone generator 104. The tone generator 104 generates a music sound signal based on musical performance data received from the performance operating element 101 or the data according to an automatic accompaniment sound generated by the accompaniment sound generating device 10.

The sound system 105 includes a digital-analogue (D/A) conversion circuit, an amplifier and a speaker. The sound system 105 converts the music sound signal supplied from the tone generator 104 into an analogue sound signal and produces a sound based on the analogue sound signal. Thus, the music sound signal is reproduced.

(2) Automatic Accompaniment Sound

Next, an automatic accompaniment sound generated by the accompaniment sound generating device 10 according to the present embodiment will be described. The accompaniment sound generating device 10 according to the present embodiment can generate two types of automatic accompaniment sounds, which are a pattern accompaniment sound and a real-time accompaniment sound. The pattern accompaniment sound is generated by repeated reproduction of prestored accompaniment pattern data. A category, etc. is designated by the player, so that accompaniment pattern data corresponding to the designated category is reproduced. The player can give a musical performance in accordance with the reproduction of a pattern accompaniment sound.

A real-time accompaniment sound is an accompaniment sound generated in real time in accordance with a musical performance sound generated by a musical performance operation performed by the player. A real-time accompaniment sound is generated for each musical performance sound in accordance with the contents of the setting data SD. When the player gives a musical performance, a real-time accompaniment sound is added based on a musical performance sound input by the player.

(3) Accompaniment Style Data

Next, the accompaniment style data set ASD will be described. The accompaniment style data set ASD is the data obtained when the contents of a pattern accompaniment sound are classified according to categories. Further, the accompaniment style data set ASD may be utilized when a tone color of a real-time accompaniment sound is determined.

Figure 2:
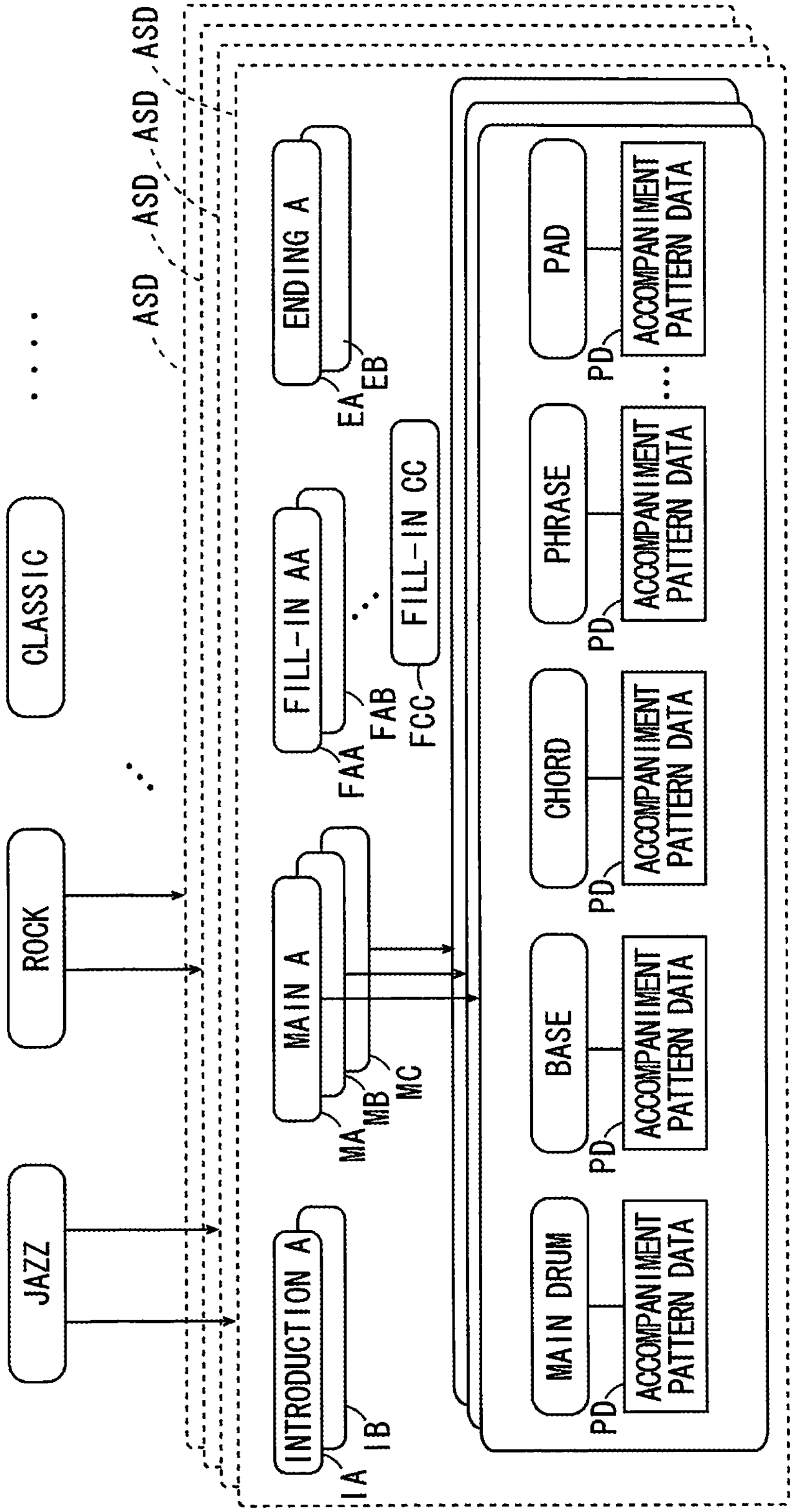
FIG. 2 is a diagram showing the structure of data of accompaniment style data.

FIG. 2 is a diagram showing the data structure of the accompaniment style data set ASD. As shown in FIG. 2, one or a plurality of accompaniment style data sets ASD are prepared for each category such as jazz, rock or classic. Such categories may be provided hierarchically. For example, hard rock, progressive rock and the like may be provided as subcategories of rock. Each accompaniment style data set ASD includes a plurality of accompaniment section data sets.

The accompaniment section data sets are classified into data sets for an “introduction” section, data sets for a “main” section, data sets for a “fill-in” section and data sets for an “ending” section. “Introduction,” “main,” “fill-in” and “ending” represent types of sections, respectively, and are indicated by alphabetic letters “I,” “M,” “F” and “E,” respectively. Each accompaniment section data set is further classified into a plurality of variations.

The variations of the “introduction” section, the “main” section and the “ending” section indicate an atmosphere or a degree of climax of an automatic accompaniment sound. In the example of FIG. 2, the variations are indicated by alphabetic letters “A” (normal (calm)), “B” (a little brilliant), “C” (brilliant), “D” (very brilliant) and so on in accordance with the degree of climax.

Because the “fill-in” section is a fill-in between other sections, the variations of the “fill-in” section are represented by a combination of two alphabetic letters corresponding to a change in atmosphere or degree of climax between the section before the fill-in section and the section after the fill-in section in FIG. 2. For example, the variation “AC” corresponds to a change from “calm” to “brilliant.”

In FIG. 2, each accompaniment section data set is represented by a combination of an alphabetic letter indicative of the type of the section and an alphabetic letter indicative of the variation. For example, the type of the section of an accompaniment section data set MA is “main,” and the variation thereof is “A.” Also, the type of the section of an accompaniment section data set FAB is “fill-in,” and the variation thereof is “AB.”

The accompaniment section data set includes an accompaniment pattern data set PD in regard to each of a plurality of musical performance parts (tracks) such as a main drum part, a base part, a chord part, a phrase part and a pad part. Further, each accompaniment section data set includes reference chord information and a pitch conversion rule (pitch conversion table information, a sound range, a sound regeneration rule at the time of chord change and so on). The accompaniment pattern data set PD is MIDI data or audio data, and can be converted into any pitch based on the reference chord information and the pitch conversion rule. The number of the musical performance parts for which pattern accompaniment sounds are to be generated, the note sequence of the accompaniment pattern data set PD and the like are different depending on the corresponding variation.

For example, the player can select the category of a desired pattern accompaniment sound and an accompaniment style data set ASD by using the setting operating element 102 of FIG. 1. A list of accompaniment section data sets (including variations) may be displayed on the display 103 based on the category of a pattern accompaniment sound and the name of an accompaniment style. Then, the player may be able to select the category, the name of an accompaniment style, etc. by using the setting operating element 102. Further, the player sets the structure of a music piece by using the setting operating element 102 of FIG. 1. The structure of a music piece is the arrangement of sections that constitute a music piece. For example, which section each period from the start to the end of a music piece corresponds to is set. Thus, the order of the accompaniment pattern data sets PD that constitute a pattern accompaniment sound is specified. Alternatively, an accompaniment style data set ASD and the structure of a music piece may be automatically selected when the player selects a desired music piece from among a plurality of pre-registered music pieces. A pattern accompaniment sound is output from the sound system 105 of FIG. 1 based on the contents of selection of a pattern accompaniment sound selected by the player in this manner and the accompaniment style data set ASD.

(4) Functional Configuration of Accompaniment Sound Generating Device

Figure 3:
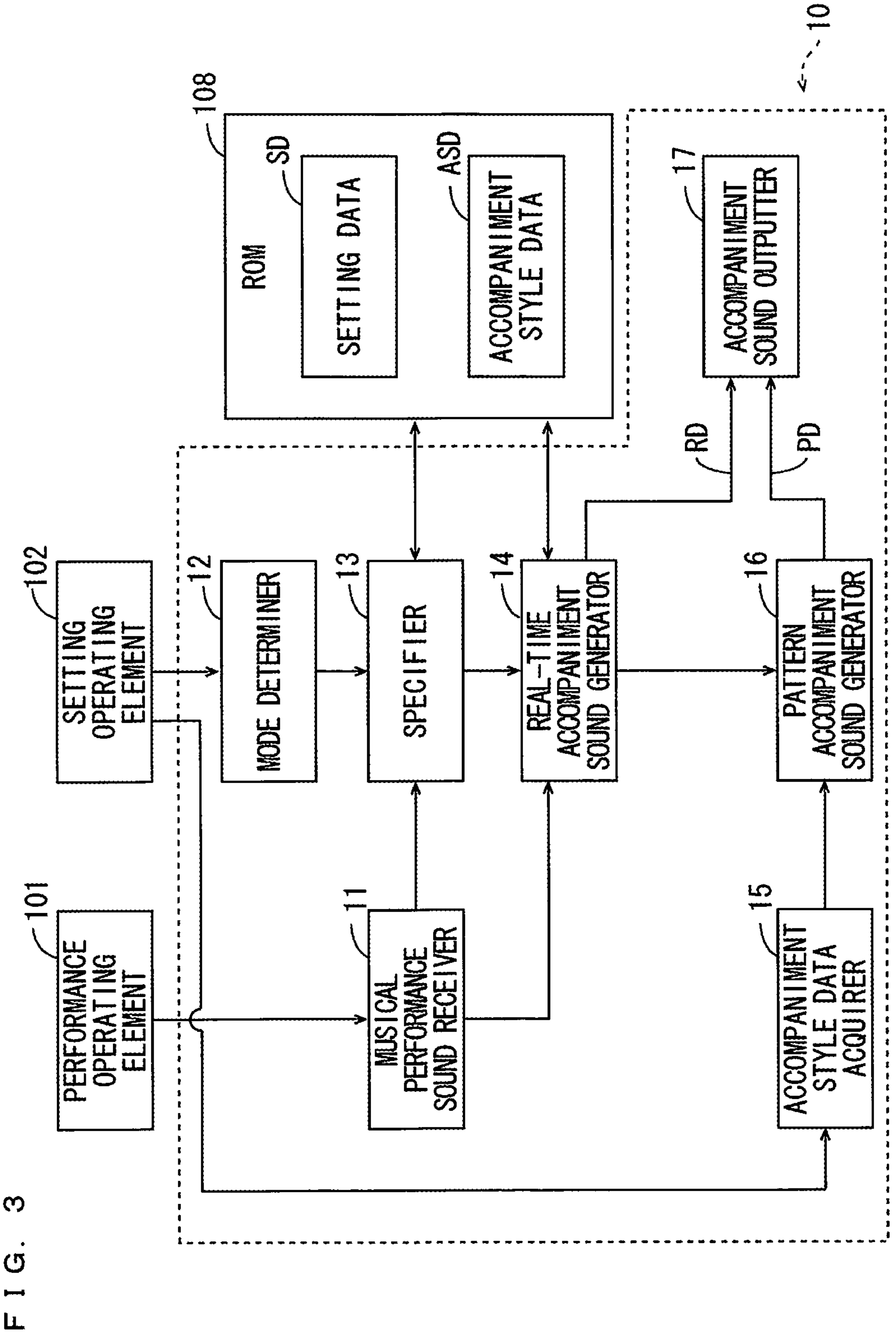
FIG. 3 is a block diagram of the functions of an accompaniment sound generating device.

FIG. 3 is a block diagram showing the functional configuration of the accompaniment sound generating device 10 according to the embodiment of present disclosure. The accompaniment sound generating device 10 is a device that generates a pattern accompaniment sound and a real-time accompaniment sound. The CPU 106 of FIG. 1 executes the accompaniment sound generating program P1 stored in the ROM 108 or the storage device 109, whereby the function of each component of the accompaniment sound generating device 10 in FIG. 3 is implemented. As shown in FIG. 3, the accompaniment sound generating device 10 includes a musical performance sound receiver 11, a mode determiner 12, a specifier 13, a real-time accompaniment sound generator 14, an accompaniment style data acquirer 15, a pattern accompaniment sound generator 16 and an accompaniment sound outputter 17.

The musical performance sound receiver 11 receives musical performance data (a musical performance sound) output from the performance operating element 101. The musical performance sound receiver 11 outputs the musical performance data to the specifier 13 and the real-time accompaniment sound generator 14. As described above, MIDI data or audio data is used as musical performance data.

The mode determiner 12 receives a mode operation performed by the player from the setting operating element 102. The accompaniment sound generating device 10 of the present embodiment has a plurality of modes as modes for performing real-time accompaniment. The player can perform a mode setting by using the setting operating element 102. In the present embodiment, two modes which are an accent mode and a unison mode are prepared as the modes for real-time accompaniment.

The specifier 13 specifies a musical performance part for which a real-time accompaniment sound is to be generated. Similarly to pattern accompaniment sounds, real-time accompaniment sounds are output for a plurality of musical performance parts such as a main drum part, a base part, a chord part, a phrase part and a pad part with the timing for generating the real-time accompaniment sounds aligned with the timing for generating musical performance sounds. The specifier 13 specifies musical performance parts for which real-time accompaniment sounds are to be generated based on musical performance data received from the musical performance sound receiver 11. That is, the specifier 13 specifies a plurality of musical performance parts for which real-time accompaniment sounds are to be generated in regard to each musical performance sound.

The real-time accompaniment sound generator 14 generates real-time accompaniment data RD. The real-time accompaniment sound generator 14 generates real-time accompaniment data RD to be generated for the musical performance part specified by the specifier 13. The real-time accompaniment sound generator 14 determines a tone color, the volume and so on of a real-time accompaniment sound based on the musical performance data (musical performance sound) received from the musical performance sound receiver 11. The real-time accompaniment sound generator 14 outputs the generated real-time accompaniment data RD to the accompaniment sound outputter 17. The accompaniment sound outputter 17 outputs the real-time accompaniment data RD to the tone generator 104 shown in FIG. 1. The tone generator 104 reproduces a real-time accompaniment sound via the sound system 105.

The accompaniment style data acquirer 15 acquires an accompaniment style data set ASD. As described above, the player performs an operation of selecting a pattern accompaniment sound, whereby the accompaniment style data acquirer 15 accesses the ROM 108 and acquires the selected accompaniment style data set ASD.

The pattern accompaniment sound generator 16 receives the accompaniment style data set ASD acquired by the accompaniment style data acquirer 15, and acquires accompaniment pattern data set PD to be used for a pattern accompaniment sound from the accompaniment style data set ASD. The pattern accompaniment sound generator 16 acquires the accompaniment pattern data set PD included in the accompaniment style data set ASD based on the accompaniment section data including the variation selected by the player. The pattern accompaniment sound generator 16 performs pitch conversion necessary for the accompaniment pattern data set PD and outputs the converted accompaniment pattern data set PD to the accompaniment sound outputter 17 in accordance with a tempo of a musical performance sound. The accompaniment sound outputter 17 outputs the accompaniment pattern data set PD to the tone generator 104 shown in FIG. 1. The tone generator 104 reproduces a pattern accompaniment sound via the sound system 105.

The real-time accompaniment sound generator 14 also provides an instruction for stopping generation of pattern accompaniment data to the pattern accompaniment sound generator 16. When the real-time accompaniment data RD is being generated, generation of the accompaniment pattern data set PD is stopped. That is, when a real-time accompaniment sound is output, a pattern accompaniment sound is muted for a set period of time. Further, when the accent mode or the unison mode is turned on, generation of the accompaniment pattern data set PD is stopped in regard to part of the musical performance parts for which real-time accompaniment data RD is generated. That is, in a case where either of the modes is turned on, a pattern accompaniment sound is muted for each musical performance part in regard to part of the musical performance parts.

(5) Mode of Real-Time Accompaniment Function

As described above, the accompaniment sound generating device 10 of the present embodiment has the accent mode and the unison mode as the modes for generation of a real-time accompaniment sound. In the accent mode, for example, when the player strongly depresses a key or the player gives a music performance in forte, an automatic accompaniment sound such as the sound of a cymbal being struck strongly is generated. In the unison mode, for example, an automatic accompaniment sound such as the sound of a stringed musical instrument at the same pitch as that of a sound of piano in accordance with a melody of piano or such as the sound of a stringed musical instrument that has the same name of musical note as a sound of piano and has a relationship of octave with a sound of piano is generated.

FIGS. 4 and 5 are diagrams showing the contents of the setting data SD. FIG. 4 shows the contents of data of the accent mode out of the data registered in the setting data SD. FIG. 5 shows the contents of data of the unison mode out of the data registered in the setting data SD. In either of the modes, the data relating to a "musical performance sound (input sound)," a "strength condition," a "conversion destination," a "mute subject" and a "mute cancellation time" are registered in the setting data SD.

The "musical performance sound (input sound)" is the data representing the type of a musical performance sound. The real-time accompaniment sound generator 14 determines a musical performance sound in accordance with predetermined algorithm. A "top note" indicates a highest pitch among the sounds included in a musical performance sound. For example, when the player is playing chords, the highest pitch among the chords is determined as a top note. "All notes" indicate all of the sounds included in a musical performance sound. A "chord" indicates a musical performance sound having a harmonic (or accompaniment) role among the sounds played simultaneously at one time. A "bottom note" indicates the lowest pitch among the sounds included in a musical performance sound. For example, when the player is playing chords, the lowest pitch among the chords is determined as a bottom note.

The "strength condition" indicates a strength condition of a "musical performance sound." In FIGS. 4 and 5, although the "strength condition" is indicated by intuitively easy expressions such as "strong," "equal to or stronger than medium strength and weaker than strong" and the like, the strength condition is actually indicated by a specific numeric value such as a velocity or a volume.

The "conversion destination" further includes fields for a "part" and a "pitch (musical instrument)." In the "part," a musical performance part for which a real-time accompaniment sound is to be generated is registered. In the "pitch (musical instrument)," a pitch of a real-time accompaniment sound or a musical instrument is indicated. As a musical performance part for which a real-time accompaniment sound is to be generated, a "main drum," a "chord 1," a "phase 1" and so on are designated similarly to a musical performance part included in accompaniment style data set ASD. As a pitch (music instrument) for generation of a real-time accompaniment sound, a drum kit is usually set in a case where the musical performance part is the "main drum." The drum kit is set when a rhythm musical instrument that is used in the drum kit is assigned to a note number of MIDI. The type of a rhythm musical instrument and the assigning method are different depending on a drum kit. In a case where the "pitch (musical instrument)" of "conversion destination" is "cymbal" in FIG. 4, a musical performance sound is converted into a sound having a pitch to which a cymbal is assigned in a case where a part tone color is actually designated to each drum kit. The high/medium/low of the "pitch (musical instrument)" of the "conversion destination" does not indicate an actual conversion value but indicates "a rhythm musical instrument that generates a sound having a high pitch"/"a rhythm musical instrument that generates a sound having a medium high pitch"/"a rhythm musical instrument that generates a sound having a low pitch." In the case of FIG. 4, a tone color set for each part of the accompaniment style data set ASD that is selected (set) by the time of start of generation of a real-time accompaniment sound is applied.

The "mute subject" indicates a pattern accompaniment sound to be stopped when a real-time accompaniment sound is being generated. In a case where the accent mode or the unison mode is turned on, generation of a pattern accompaniment sound is stopped in regard to part of musical performance parts. In the "mute subject," in a case where a musical performance part is registered, when either of the modes is turned on, a pattern accompaniment sound of the musical performance part is not reproduced. Further, when a real-time accompaniment sound is being generated, a pattern accompaniment sound of the musical performance part for which a real-time accompaniment sound being generated is not reproduced. In a case where "1 sound" is registered in the "mute subject," reproduction of a pattern accompaniment sound is stopped for each sound in accordance with generation of a real-time accompaniment sound. Alternatively, reproduction of a pattern accompaniment sound may be stopped only in regard to the same sound as a real-time accompaniment sound for each sound in accordance with generation of a real-time accompaniment sound.

The "mute cancellation time" indicates a point in time at which stop of reproduction of a pattern accompaniment sound indicated by the "mute subject" is to be canceled. While "after a predetermined period of time elapses" is described as the "mute cancellation time," a period of time from the stop of reproduction of a pattern accompaniment sound to the restart of reproduction such as one sound, one beat or the like is registered specifically. In a case where "detection of OFF of input sound" is mentioned as the "mute cancellation time," it indicates that reproduction of a pattern accompaniment sound is to be restarted at a point in time at which the input of a musical performance sound is turned off. However, in a case where a musical performance part is registered in the "mute subject," mute of a pattern accompaniment sound is not canceled during a period in which the accent mode or the real-time mode continues to be turned on. In a case where the mode is turned off, mute of a pattern accompaniment sound is canceled at a point at which OFF of an input sound is detected.

For example, the data in the first row of the accent mode represents the following settings. In a case where the top note of a musical performance data (musical performance sound) is "strong," the sound of the cymbal of the main drum is generated as a real-time accompaniment sound. When the sound of the cymbal of the main drum is generated, the main drum of a pattern accompaniment sound is not reproduced. Then, after a predetermined period of time elapses, reproduction of the sound of the main drum of a pattern accompaniment sound restarts.

Further, the data in the third row of the accent mode indicates the following settings, for example. The strength of sound has no conditions with respect to all pitches of musical performance data (a musical performance sound), and a real-time accompaniment sound is generated at the same pitch as a musical performance sound (input sound) in regard to a musical performance part of the chord 1. When the accent mode is turned on, reproduction of a pattern accompaniment sound is stopped in regard to a musical performance part of the chord 1. In a case where the mode is turned off, reproduction of a pattern accompaniment sound restarts after detection of OFF of an input sound.

Further, the data in the eighth row of the accent mode represents the following settings, for example. In a case where the strength of sound of a chord included in musical performance data (a musical performance sound) is equal to or higher than medium strength and lower than strong, a kick is generated by the main drum part as a real-time accompaniment sound. When a kick is generated in the main drum part, a kick sound of the main drum of a pattern accompaniment sound is not reproduced. Then, after a predetermined period of time elapses, generation of a kick sound of the main drum of a pattern accompaniment sound restarts.

For example, the data in the third row of the unison mode represents the following settings. The strength of sound has no conditions with respect to the top note of musical performance data (a musical performance sound), and a real-time accompaniment sound is generated at the same pitch as the top note in regard to a musical performance part of the chord 1. When the unison mode is turned on, reproduction of a pattern accompaniment sound is stopped in regard to a musical performance part of the chord 1. In a case where the mode is turned off, reproduction of a pattern accompaniment sound restarts after detection of OFF of an input sound.

Further, the data in the ninth row of the unison mode represents the following settings, for example. The strength of sound has no conditions with respect to the sound of chord included in musical performance data (a musical performance sound), and a sound of snare drum is generated by the main drum part as a real-time accompaniment sound. When the sound of snare drum is generated by the main drum part, the sound of snare drum of the main drum which is a pattern accompaniment sound is not reproduced. Then, after a predetermined period of time elapses, reproduction of the sound of snare drum of the main drum which is a pattern accompaniment sound restarts.

In this manner, the setting information for generating a real-time accompaniment sound is registered in the setting data SD. Specifically, in the setting data SD shown in FIGS. 4 and 5, the information of the "part" of the "conversion destination" is registered as the information for specifying a musical performance part for which a real-time accompaniment sound is to be generated. Further, in the setting data SD, the information of the "pitch (musical instrument)" of the "conversion destination" is registered as the information relating to a generation rule of a real-time accompaniment sound. The real-time accompaniment sound generator 14 shown in FIG. 3 generates real-time accompaniment data RD for each musical performance sound included in musical performance data with reference to the setting data SD.

In the examples shown in FIGS. 4 and 5, the settings are made such that real-time accompaniment sounds are to be generated for a plurality of musical performance parts when musical performance data (a musical performance sound) is input. In this manner, the accompaniment sound generating device 10 of the present embodiment can generate real-time accompaniment sounds in regard to a plurality of musical performance parts with respect to the input of one musical performance sound.

(6) One Example of Accompaniment Sound Generating Method

Figure 6:
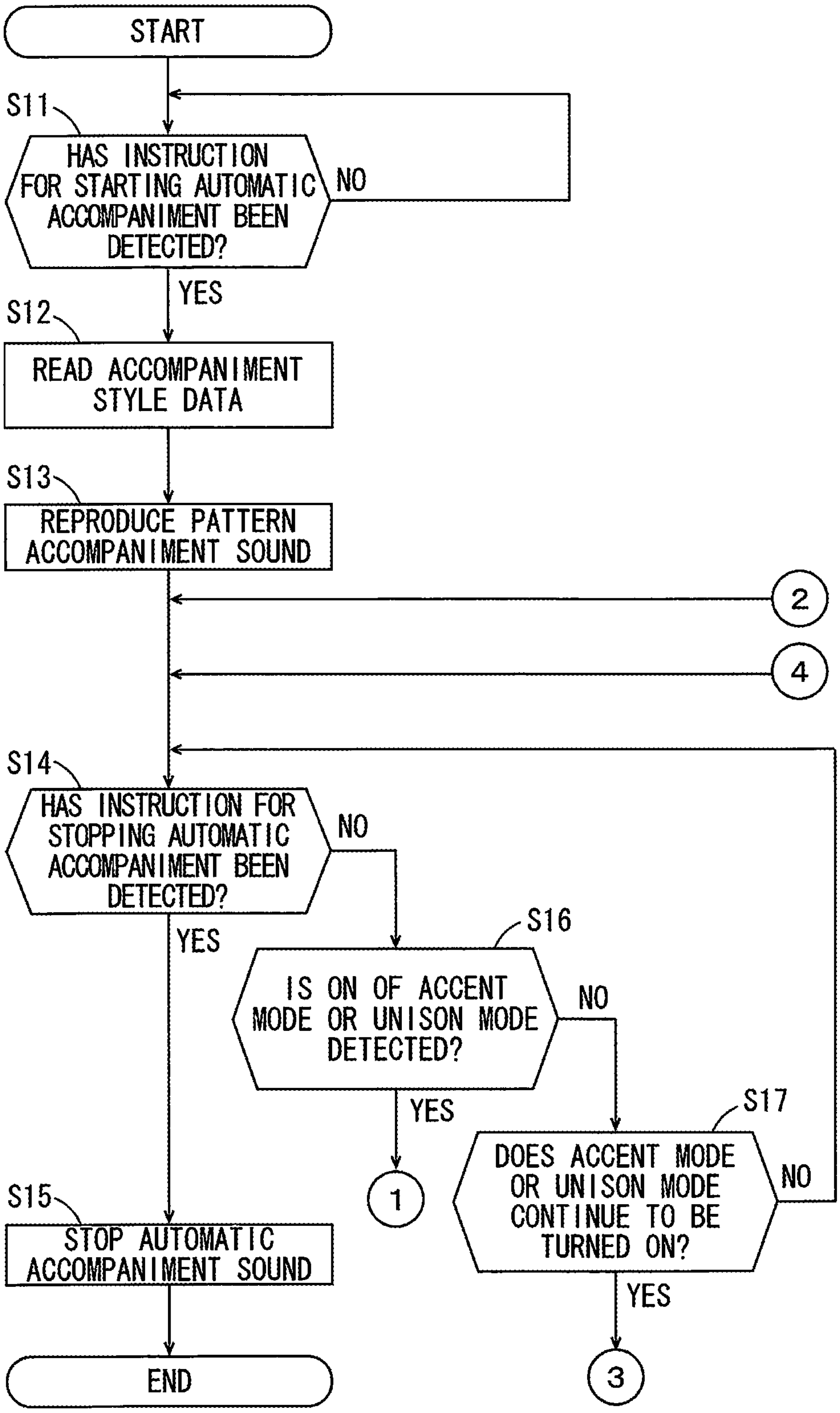
FIG. 6 is a flowchart showing an accompaniment sound generating method.
Figure 7:
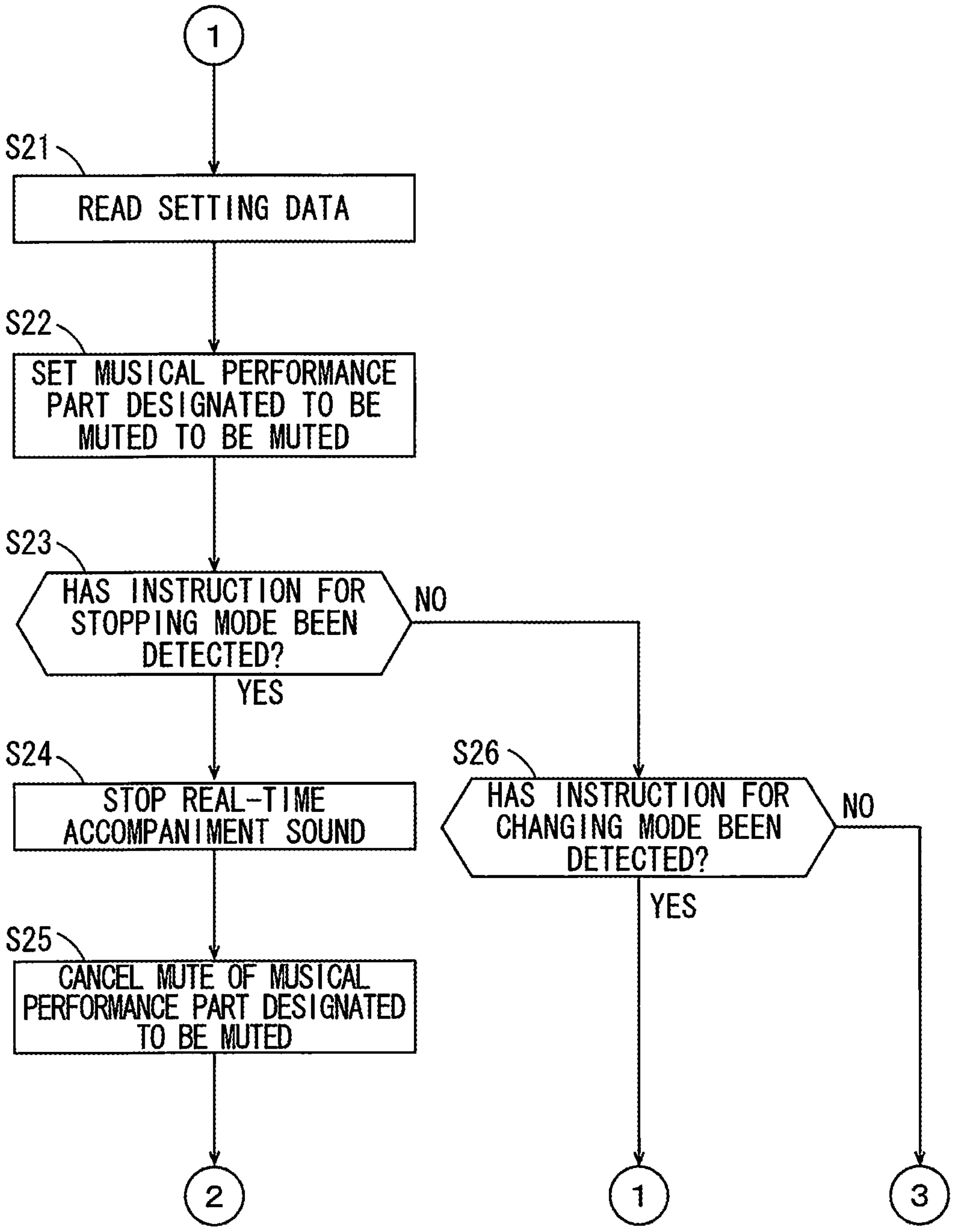
FIG. 7 is a flowchart showing the accompaniment sound generating method.
Figure 8:
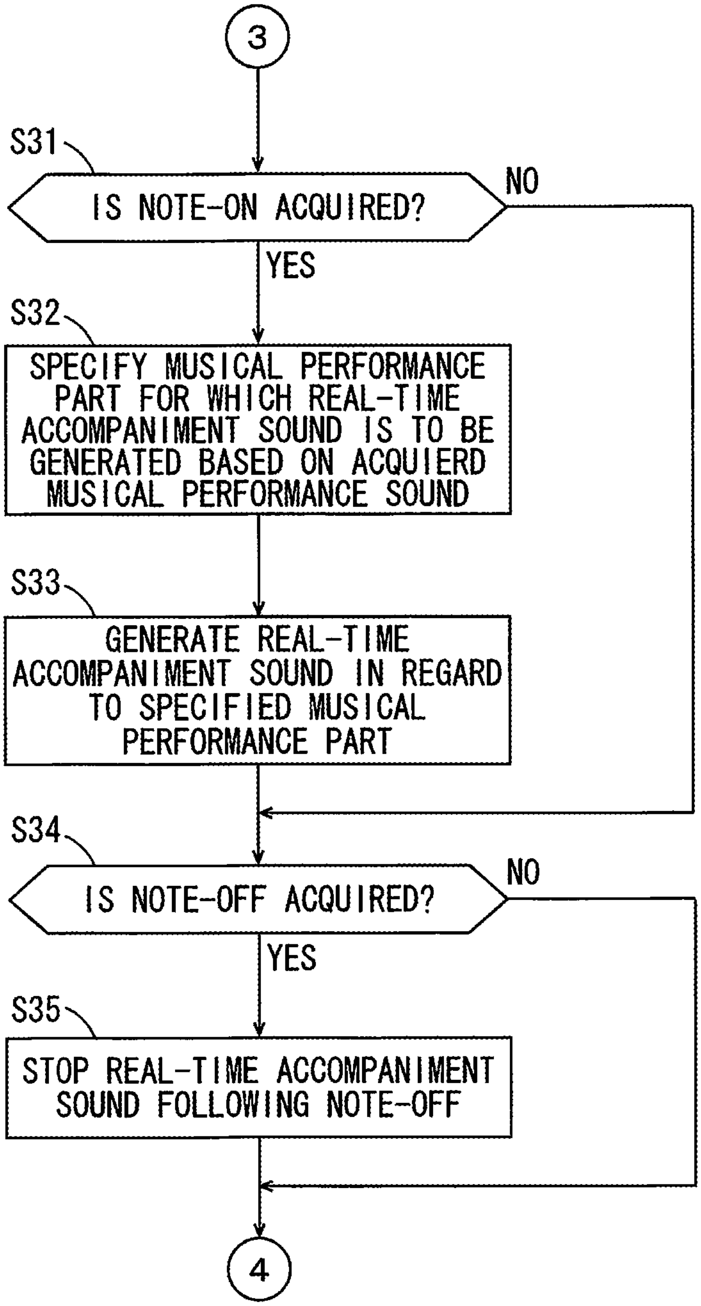
FIG. 8 is a flowchart showing the accompaniment sound generating method.

Next, the accompaniment sound generating method according to the present embodiment will be described. The CPU 106 executes the accompaniment sound generating program P1 shown in FIG. 1, whereby the accompaniment sound generating device 10 performs the below-mentioned accompaniment sound generating method. FIGS. 6, 7 and 8 are the flow charts showing the accompaniment sound generating method according to the present embodiment.

As shown in FIG. 6, in the step S11, the pattern accompaniment sound generator 16 first determines whether the setting operating element 102 has detected an instruction for starting automatic accompaniment. In a case where the instruction for starting automatic accompaniment has been detected, the accompaniment style data acquirer 15 reads accompaniment style data set ASD from the ROM 108 in the step S12. The accompaniment style data acquirer 15 reads the accompaniment style data set ASD based on the selection information of the accompaniment style data set ASD or category information received from the setting operating element 102. Next, in the step S13, the pattern accompaniment sound generator 16 acquires the accompaniment pattern data set PD and supplies the accompaniment pattern data set PD to the accompaniment sound outputter 17. The accompaniment sound outputter 17 outputs the accompaniment pattern data set PD to the tone generator 104. Thus, reproduction of a pattern accompaniment sound is started via the sound system 105. As described above, the pattern accompaniment sound generator 16 acquires the accompaniment pattern data set PD included in the accompaniment style data set ASD based on the accompaniment section data including the variation selected by the player.

Then, in the step S14, the pattern accompaniment sound generator 16 determines whether the setting operating element 102 has detected an instruction for stopping the automatic accompaniment. In a case where the instruction for stopping the automatic accompaniment has been detected, the pattern accompaniment sound generator 16 stops generating the accompaniment pattern data set PD and stops reproduction of a pattern accompaniment sound in the step S15.

In a case where the instruction for stopping automatic accompaniment has not been detected in the step S14, whether the mode determiner 12 has detected ON of the accent mode or the unison mode is determined in the step S16. That is, whether the mode determiner 12 has detected an instruction for starting a real-time accompaniment function is determined. In a case where the mode determiner 12 detects ON of the accent mode or the unison mode, the real-time accompaniment sound generator 14 reads setting data SD in the step S21 of FIG. 7. In a case where the mode determiner 12 detects a continuation of ON of accent mode or unison mode in the step S17, the musical performance sound receiver 11 determines whether a note-on has been acquired in the step S31 of FIG. 8.

Subsequently, in a case where a musical performance part for which a pattern accompaniment sound is to be stopped is present, the real-time accompaniment sound generator 14 provides an instruction for stopping a pattern accompaniment sound to the pattern accompaniment sound generator 16. The real-time accompaniment sound generator 14 makes reference to the setting data SD. In a case where generation of a pattern accompaniment sound is set to be stopped (muted) in units of a musical performance part in the "mute subject," the real-time accompaniment sound generator 14 provides an instruction for stopping a pattern accompaniment sound in regard to the musical performance part. In response to this instruction, the pattern accompaniment sound generator 16 stops outputting accompaniment pattern data set PD in regard to a musical performance part for which a stop instruction has been provided (step S22).

Next, in the step S23, the mode determiner 12 determines whether the instruction for stopping a currently set mode has been detected. In a case where the mode determiner 12 has detected the instruction for stopping the mode, the real-time accompaniment sound generator 14 stops generating real-time accompaniment data RD (step S24). Further, the real-time accompaniment sound generator 14 instructs the pattern accompaniment sound generator 16 to restart generating a pattern accompaniment sound in regard to a musical performance part for which generation of a pattern accompaniment sound is being stopped (muted) (step S25). Thereafter, the process returns to the step S14 of FIG. 6.

In a case where the mode determiner 12 has not detected an instruction for stopping the mode in the step S23, the mode determiner 12 determines whether the instruction for changing a mode has been detected in the step S26. For example, whether the mode has been changed from the accent mode to the unison mode, etc. is determined. In a case where the instruction for changing a mode has been detected, the process returns to the step S21, and the setting data SD of the mode after the change is read. In a case where the instruction for changing a mode has not been detected, the musical performance sound receiver 11 determines whether a note-on has been acquired in the step S31 of FIG. 8. A note-on is an input event of a musical performance sound due to depression of a key of the keyboard. That is, the musical performance sound receiver 11 determines whether the input of musical performance data (a musical performance sound) by the player has been acquired.

When the musical performance sound receiver 11 acquires a note-on, the specifier 13 specifies a musical performance part for which a real-time accompaniment sound is to be generated based on the acquired musical performance sound in the step S32. The specifier 13 makes reference to the setting data SD, and specifies a musical performance part for which a real-time accompaniment sound is to be generated based on the information of the "part" of the "conversion destination" corresponding to a currently set mode. Subsequently, in the step S33, the real-time accompaniment sound generator 14 generates real-time accompaniment data RD in regard to the specified musical performance part. The real-time accompaniment sound generator 14 makes reference to the setting data SD, and determines the pitch, the tone color, the volume and so on of a real-time accompaniment sound to be generated based on the information of the "pitch (musical instrument)" of the "conversion destination" corresponding to a currently set mode.

The real-time accompaniment data RD generated in the real-time accompaniment sound generator 14 is supplied to the accompaniment sound outputter 17. The accompaniment sound outputter 17 outputs the real-time accompaniment data RD to the tone generator 104 with the timing for generating a real-time accompaniment sound aligned with the timing for generating the acquired musical performance sound of a note-on. In a case where real-time accompaniment data RD is reproduced in regard to a plurality of musical performance parts, the real-time accompaniment data RD for the plurality of musical performance parts is output to the tone generator 104 with the timing for generating a real-time accompaniment sound aligned with the timing for generating a musical performance sound. Thus, the sound system 105 outputs a musical performance sound and real-time accompaniment sounds for the plurality of musical performance parts with the timing for generating the musical performance sound aligned with the timing for generating the real-time accompaniment sounds.

In the step S34, the musical performance sound receiver 11 determines whether a note-off has been acquired. A note-off indicates that the input of musical performance data (a musical performance sound) has been changed from an ON state to an OFF state. When the musical performance sound receiver 11 acquires a note-off, the real-time accompaniment sound generator 14 stops generating a real-time accompaniment sound following a note-off in the step S35.

(7) Sequence of Automatic Accompaniment Generation

Figure 9:
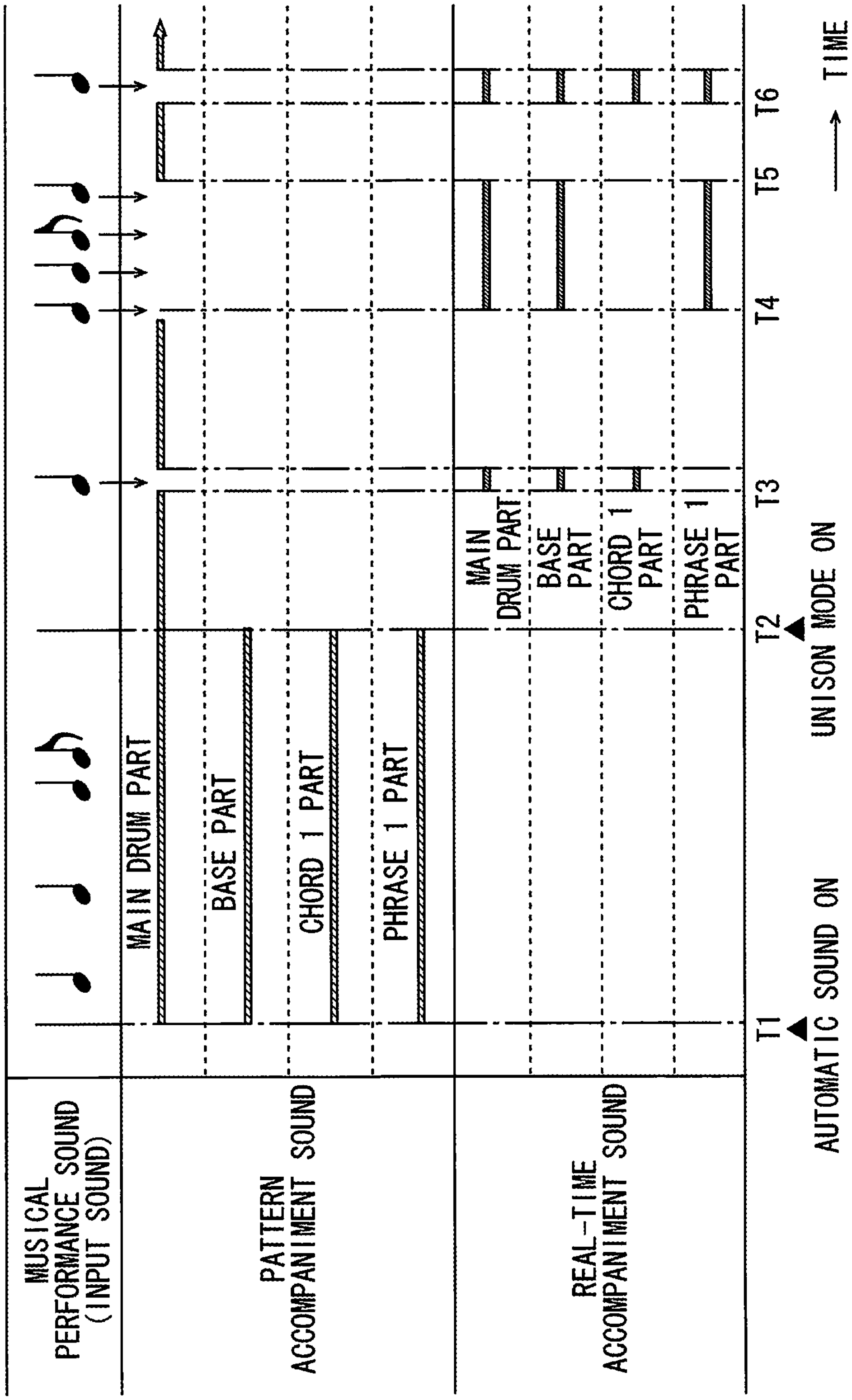
FIG. 9 is a diagram of the sequence of automatic accompaniment generation.

FIG. 9 is a diagram showing the sequence of automatic accompaniment sounds including pattern accompaniment sounds and real-time accompaniment sounds. In FIG. 9, the time advances from the left to the right in the diagram. First, at a point T1 in time, an instruction for starting automatic accompaniment is provided, and generation of pattern accompaniment sounds is started. Pattern accompaniment sounds are generated for musical performance parts including a main drum part, a base part, a chord 1 part and a phrase 1 part. After the point T1 in time, pattern accompaniment sounds are generated in accordance with musical performance sounds input by the player.

Next, at a point T2 in time, ON of the unison mode is detected. Thus, pattern accompaniment sounds are stopped (muted) in regard to musical performance parts including the base part, the chord 1 part and the phrase 1 part. At the point T2 in time and later, generation of a pattern accompaniment sound continues in regard to the main drum part.

Next, at a point T3 in time, a musical performance sound is input. Real-time accompaniment sounds are generated for the main drum part, the base part and the chord 1 part based on the musical performance sound. Then, at the point T3 in time, the pattern accompaniment sound for the main drum part is stopped (muted). Between points T4 and T5 in time, musical performance sounds are input again. Based on this musical performance sound, real-time accompaniment sounds are generated for the main drum part, the base part and the phrase 1 part. Then, between the points T4 and T5 in time, the pattern accompaniment sound for the main drum part is stopped (muted). Subsequently, at a point T6 in time, a musical performance sound is input. Based on the musical performance sound, real-time accompaniment sounds are generated for all of the musical performance parts. Then, at the point T6 in time, a pattern accompaniment sound for the main drum part is stopped (muted).

(8) Effects of Embodiments

The accompaniment sound generating device of the present embodiment specifies a plurality of musical performance parts for which real-time accompaniment sounds are to be generated based on an input musical performance sound and generates the real-time accompaniment sounds that belong to the plurality of specified musical performance parts. Then, the real-time accompaniment sounds generated for the plurality of musical performance parts are output with the timing for generating the real-time accompaniment sounds aligned with the timing for generating a musical performance sound. Thus, the player can enjoy automatic accompaniment sounds having variations. Because a real-time accompaniment sound is generated for each musical performance sound, the automatic accompaniment sound is not monotonous to the player.

Further, with the present embodiment, a plurality of modes are prepared as the modes for generation of a real-time accompaniment sound based on a musical performance sound. Then, in the setting data SD, a plurality of musical performance parts for which real-time accompaniment sounds are to be generated in each mode are registered. A real-time accompaniment sound can be adjusted in accordance with a mode preferred by the player.

Further, with the present embodiment, the setting data SD includes information relating to the generation rule of a real-time accompaniment sound to be generated based on a musical performance sound in each mode. Then, the real-time accompaniment sound generator 14 makes reference to the setting data SD and generates a real-time accompaniment sound based on a musical performance sound in accordance with the generation rule corresponding to a set mode. A real-time accompaniment sound can be adjusted in accordance with a mode preferred by the player.

For example, when two human players perform, in a case where syncopation or a "match (or tutti)" is present in a music piece, the players perform in accordance with syncopation or a match. However, since using a pattern accompaniment sound, a conventional automatic accompaniment sound generating device cannot give such a musical performance. That is, performance expression that has a sense of unity which can be realized by human players cannot be provided by the conventional automatic accompaniment sound generating device unless corresponding accompaniment sound data is prepared in advance. If such accompaniment sound data is to be prepared in advance, a large amount of data is required. Further, it is difficult and requires time for a general user to create such accompaniment sound data. With the accompaniment sound generating device of the present embodiment, a musical performance part is specified for each musical performance sound, and a real-time accompaniment sound is generated based on a musical performance sound. Thus, an automatic accompaniment sound corresponding to an impromptu musical performance such as syncopation or a "match" can be reproduced in real time.

Further, with the present embodiment, during a period in which a real-time accompaniment sound is being generated, the pattern accompaniment sound generator 16 stops generating a pattern accompaniment sound in regard to a same musical performance part. It is easier for the player to listen to a real-time accompaniment sound, and the user can enjoy the real-time accompaniment sound.

Further, with the present embodiment, when either of the modes in which a real-time accompaniment sound is to be generated is turned on, the pattern accompaniment sound generator 16 stops generating a pattern accompaniment sound in regard to a musical performance part such as the base part, the chord part, the pad part or the phrase part. It is easier for the player to listen to a real-time accompaniment sound, and the user can enjoy the real-time accompaniment sound. Further, when either of the modes in which a real-time accompaniment sound is to be generated is turned on, generation of a pattern accompaniment sound continues in regard to a musical performance part such as the main drum part. The player can enjoy a real-time accompaniment sound in a flow of a pattern accompaniment sound.

(9) Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. However, the present disclosure is not limited to the below-mentioned examples. In the above-mentioned embodiment, the real-time accompaniment sound is an example of an accompaniment sound in claims. In the above-mentioned embodiment, the setting data SD is an example of setting information. In the above-mentioned embodiment, the "musical performance sound (input sound)" and the "strength condition" in FIG. 4 are examples of characteristics of a musical performance sound, and the "pitch (musical instrument) of the "conversion destination" in FIG. 4 is an example of characteristics of an accompaniment sound. In the above-mentioned embodiment, the base part, the chord 1 part and the phrase 1 part in FIG. 9 are examples of a first musical performance part, and the main drum part is an example of a second musical performance part. The first musical performance part may include a plurality of musical performance parts. Further, the second musical performance part may include a plurality of musical performance parts.

As each of each constituent elements, various elements recited in the claims, various other elements having configurations or functions described in the claims can be also used.

(10) Other Embodiments

While the accent mode and the unison mode are described as the modes for real-time accompaniment, by way of example, in the above-mentioned embodiment, this is merely one example. For example, modes corresponding to the categories such as a hard rock mode or a jazz mode and so on may be prepared.

In the above-mentioned embodiment, the tone color, the volume and so on of a real-time accompaniment sound are determined with reference to the "pitch (musical instrument)" of the "conversion destination" of the setting data SD. In another embodiment, the tone color, the volume and so on of a real-time accompaniment sound may be determined with reference to the accompaniment style data set ASD based on the category and genre currently set for a pattern accompaniment sound.

In the above-mentioned embodiment, during a period in which the mode for a real-time accompaniment sound is turned on, a pattern accompaniment sound is set to be muted in regard to musical performance parts other than the main drum part, and a pattern accompaniment sound continued to be generated only for the main drum part. In another embodiment, generation of a pattern accompaniment sound may continue for part of the other musical performance parts in accordance with the main drum part. For example, generation of a pattern accompaniment sound may continue for the main drum part and the base part.

Further, when the unison mode is changed to the other mode (the unison mode is turned off or changed to the accent mode), generation of a pattern accompaniment sound for an accompaniment part other than rhythm does not have to be restarted until an instruction for changing a chord is received.

(11) Characteristics of Embodiments

The accompaniment sound generating device, the electronic musical instrument, the accompaniment sound generating method and the non-transitory computer readable medium storing the accompaniment sound generating program have characteristics described below.

An accompaniment sound generating device according to one aspect of the present disclosure includes a specifier that specifies a plurality of musical performance parts for which accompaniment sounds are to be generated based on an input musical performance sound, an accompaniment sound generator that generates the accompaniment sounds that belong to the plurality of specified musical performance parts for each musical performance sound and an accompaniment sound outputter that outputs the accompaniment sounds generated for the plurality of musical performance parts with timing for generating the accompaniment sounds aligned with timing for generating musical performance sounds.

A plurality of modes may be prepared as modes for generation of an accompaniment sound based on the musical performance sound, and the specifier may make reference to setting information in which the plurality of musical performance parts for which the accompaniment sounds are to be generated in each mode are registered and may specify the plurality of musical performance parts corresponding to a set mode. The setting information may include information relating to a generation rule of the accompaniment sound to be generated based on the musical performance sound in each mode, and the accompaniment sound generator may make reference to the setting information and may generate the accompaniment sounds based on the musical performance sound in accordance with the generation rule corresponding to a set mode.

Information that associates characteristics of the musical performance sound to characteristics of the accompaniment sound may be registered as the generation rule in the setting information.

An electronic musical instrument according to another aspect of the present disclosure that includes the above-mentioned accompaniment sound generating device, includes a pattern accompaniment sound generator that generates a pattern accompaniment sound for a predetermined musical performance part based on predetermined accompaniment pattern information, wherein the pattern accompaniment sound generator stops generating the pattern accompaniment sound in regard to a same musical performance part as a musical performance part for which the accompaniment sound is generated during a period in which the accompaniment sound is being generated from the accompaniment sound generator.

The pattern accompaniment sound generator may stop generating the pattern accompaniment sound in regard to a first musical performance part, and may continue generating the pattern accompaniment sound in regard to a second musical performance part, when a mode in which the accompaniment sound is to be generated is turned on.

An accompaniment sound generating method according to yet another aspect of the present disclosure for specifying a plurality of musical performance parts for which accompaniment sounds are to be generated based on an input musical performance sound, generating the accompaniment sounds that belong to the plurality of specified musical performance parts for each musical performance sound and outputting the accompaniment sounds generated for the plurality of musical performance parts with timing for generating the accompaniment sounds aligned with timing for generating musical performance sounds.

An accompaniment sound generating program according to yet another aspect of the present disclosure causes a computer to execute the processes of specifying a plurality of musical performance parts for which accompaniment sounds are to be generated based on an input musical performance sound, generating the accompaniment sounds that belong to the plurality of specified musical performance parts for each musical performance sound and outputting the accompaniment sounds generated for the plurality of musical performance parts with timing for generating the accompaniment sounds aligned with timing for generating musical performance sounds.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. An accompaniment sound generating device comprising:

a specifier that specifies a plurality of musical performance parts for which accompaniment sounds are generated based on at least one input musical performance sound;

an accompaniment sound generator that generates the accompaniment sounds that belong to the plurality of specified musical performance parts for each input musical performance sound;

an accompaniment sound outputter that outputs the accompaniment sounds generated for the plurality of musical performance parts with timing for generating the input musical performance sound to a tone generator, wherein, the tone generator reproduces the accompaniment sounds via a sound system.

2. The accompaniment sound generating device according to claim 1, wherein a plurality of modes are prepared as modes for generation of an accompaniment sound based on the input musical performance sound, and the specifier makes reference to setting information in which the plurality of musical performance parts for which the accompaniment sounds are generated in each mode are registered, and specifies the plurality of musical performance parts corresponding to a set mode.

3. The accompaniment sound generating device according to claim 2, wherein the setting information includes information relating to a generation rule of the accompaniment sound generated based on the input musical performance sound in each mode, and the accompaniment sound generator makes reference to the setting information and generates the accompaniment sounds based on the input musical performance sound in accordance with the generation rule corresponding to the set mode.

4. The accompaniment sound generating device according to claim 3, wherein information that associates characteristics of the input musical performance sound to characteristics of the accompaniment sound is registered as the generation rule in the setting information.

5. An electronic musical instrument that includes the accompaniment sound generating device according to claim 1, further comprising: a pattern accompaniment sound generator that generates a pattern accompaniment sound for a predetermined musical performance part based on predetermined accompaniment pattern information, wherein the pattern accompaniment sound generator stops generating the pattern accompaniment sound during a period in which the accompaniment sound is generated from the accompaniment sound generator.

6. The electronic musical instrument according to claim 5, wherein the pattern accompaniment sound generator stops generating the pattern accompaniment sound associated with a first musical performance part, and continues generating the pattern accompaniment sound associated with a second musical performance part, when a mode in which the accompaniment sound is generated is turned on.

7. An accompaniment sound generating method for:

specifying a plurality of musical performance parts for which accompaniment sounds are generated based on at least one input musical performance sound;

generating the accompaniment sounds that belong to the plurality of specified musical performance parts for each input musical performance sound; and outputting the accompaniment sounds generated for the plurality of musical performance parts with timing for generating the accompaniment sounds aligned with timing for generating the input musical performance sounds to a tone generator, wherein, the tone generator reproduces the accompaniment sounds via a sound system.

8. A non-transitory computer readable medium storing an accompaniment sound generating program, the accompaniment sound generation program causing a computer to execute a processes of:

specifying a plurality of musical performance parts for which accompaniment sounds are generated based on at least one input musical performance sound;

generating the accompaniment sounds that belong to the plurality of specified musical performance parts for each input musical performance sound; and outputting the accompaniment sounds generated for the plurality of musical performance parts with timing for generating the accompaniment sounds aligned with timing for generating the input musical performance sounds to a tone generator, wherein, the tone generator reproduces the accompaniment sounds via a sound system.

* * * * *